United States Patent
Suzuki et al.

(10) Patent No.: US 9,941,514 B2
(45) Date of Patent: Apr. 10, 2018

(54) CATHODE ACTIVE MATERIAL LAYER, ALL SOLID LITHIUM BATTERY, AND METHOD OF MANUFACTURING CATHODE ACTIVE MATERIAL LAYER

(71) Applicant: TOYOTA JIDOSHA KABUSHIKI KAISHA, Toyota-shi, Aichi-ken (JP)

(72) Inventors: Tomoya Suzuki, Seto (JP); Hajime Hasegawa, Susono (JP); Nariaki Miki, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 138 days.

(21) Appl. No.: 15/190,969

(22) Filed: Jun. 23, 2016

(65) Prior Publication Data

US 2016/0380266 A1    Dec. 29, 2016

(30) Foreign Application Priority Data

Jun. 29, 2015 (JP) ................................. 2015-130247

(51) Int. Cl.
*H01M 4/36* (2006.01)
*H01M 2/16* (2006.01)
(Continued)

(52) U.S. Cl.
CPC ......... *H01M 4/366* (2013.01); *H01M 2/1646* (2013.01); *H01M 4/043* (2013.01); *H01M 4/0404* (2013.01); *H01M 4/131* (2013.01); *H01M 4/139* (2013.01); *H01M 4/483* (2013.01); *H01M 4/505* (2013.01); *H01M 4/525* (2013.01);
(Continued)

(58) Field of Classification Search
CPC .. H01M 2/1646; H01M 4/366; H01M 4/0404; H01M 4/043; H01M 4/131; H01M 4/139; H01M 4/483; H01M 4/505; H01M 4/525; H01M 4/0435; H01M 10/0525; H01M 10/0562; H01M 10/0585; H01M 2004/021; H01M 2004/028; H01M 2300/0068
See application file for complete search history.

(56) References Cited

U.S. PATENT DOCUMENTS

| 2007/0003835 | A1* | 1/2007 | Hasegawa | ............ H01M 4/382  429/231.95 |
| 2013/0224586 | A1* | 8/2013 | Nagai | .................. H01M 4/131  429/211 |

(Continued)

FOREIGN PATENT DOCUMENTS

| JP | 2009-176541 A | 8/2009 |
| JP | 2013-045761 A | 3/2013 |
| JP | 2014-150051 A | 8/2014 |

*Primary Examiner* — Gregg Cantelmo
(74) *Attorney, Agent, or Firm* — Oliff PLC

(57) ABSTRACT

A cathode active material layer used for an all solid lithium battery, comprising a flat cathode active material with a hollowness in a range of more than 0% to 10%, and a solid electrolyte material, characterized in that the flat cathode active material has an aspect ratio (long axis length/short axis length) of 1.5 or more in a section in a thickness direction of the cathode active material layer, and a ratio of the flat cathode active material of which the short axis direction corresponds to a thickness direction of the cathode active material layer is 30% or more with respect to the whole cathode active material.

20 Claims, 4 Drawing Sheets

EXAMPLE 1

(51) Int. Cl.
    *H01M 4/04*     (2006.01)
    *H01M 4/131*     (2010.01)
    *H01M 4/139*     (2010.01)
    *H01M 4/48*     (2010.01)
    *H01M 4/505*     (2010.01)
    *H01M 4/525*     (2010.01)
    *H01M 10/0525*     (2010.01)
    *H01M 10/0562*     (2010.01)
    *H01M 10/0585*     (2010.01)
    *H01M 4/02*     (2006.01)

(52) U.S. Cl.
    CPC ... *H01M 10/0525* (2013.01); *H01M 10/0562* (2013.01); *H01M 10/0585* (2013.01); *H01M 4/0435* (2013.01); *H01M 2004/021* (2013.01); *H01M 2004/028* (2013.01); *H01M 2300/0068* (2013.01)

(56) References Cited

U.S. PATENT DOCUMENTS

2013/0295451 A1* 11/2013 Miki .................. H01M 4/04
                                                                                   429/209
2014/0199589 A1     7/2014   Yamafuku et al.
2014/0199590 A1     7/2014   Tamaki et al.

* cited by examiner

COMPARATIVE EXAMPLE 1

COMPARATIVE EXAMPLE 2

EXAMPLE 1

COMPARATIVE EXAMPLE 2

EXAMPLE 1

CATHODE ACTIVE MATERIAL LAYER, ALL SOLID LITHIUM BATTERY, AND METHOD OF MANUFACTURING CATHODE ACTIVE MATERIAL LAYER

This application claims priority to Japanese Patent Application No. 2015-130247, filed Jun. 29, 2015. The entire contents of the prior application are hereby incorporated by reference herein in their entirety.

TECHNICAL FIELD

The disclosure relates to a cathode active material layer with low internal resistance.

BACKGROUND

Liquid electrolyte containing a flammable organic solvent is used for a presently commercialized lithium battery, so that a safety device for restraining temperature rise during a short circuit is necessary therefor. In contrast, an all solid lithium battery in which the liquid electrolyte is replaced with a solid electrolyte layer may intend the simplification of the safety device by reason of not using the organic solvent.

Various studies have been made in the field of the all solid lithium battery. For example, in Patent Literature 1, a cathode membrane for an all solid lithium secondary battery containing lithium ion conductive material particles including sulfur, phosphorus and lithium, in which a membrane thickness is 10 to 300 µm and a voidage is 30% or less, is disclosed. In addition, compressing at a pressure of 30 MPa or more is disclosed as a manufacturing method of the cathode membrane.

On the other hand, with regard to a technique on a lithium secondary battery using liquid electrolyte, in Patent Literature 2, active material particles having a shell part composed of a lithium transition metal oxide, a hollow part formed inside the shell part, and a through-hole for piercing through the shell part are disclosed. Similarly, in Patent Literature 3, a storage element using an active material as secondary particles formed so that plural primary particles assemble to have a hollow area inside is disclosed.

CITATION LIST

Patent Literature

Patent Literature 1: Japanese Patent Application Laid-Open No. 2009-176541
Patent Literature 2: Japanese Patent Application Laid-Open No. 2013-045761
Patent Literature 3: Japanese Patent Application Laid-Open No. 2014-150051

SUMMARY

Technical Problem

The reduction of internal resistance is demanded from the viewpoint of higher performance of an all solid lithium battery. The disclosed embodiments have been made in view of the actual circumstances, and a problem thereof is to provide a cathode active material layer with low internal resistance.

Solution to Problem

In order to solve the problems, through earnest studies, it was found that the reduction of internal resistance may be intended by pressing so strongly as to crush an active material having a hollow structure. The disclosed embodiments have been made on the basis of such findings.

In a first embodiment, there is provided a cathode active material layer for use in an all solid lithium battery. The active material layer comprises a flat cathode active material having a hollowness in the range of more than 0% to 10% and an aspect ratio (long axis length/short axis length) of 1.5 or more in a section in a thickness direction of the cathode active material layer, and a solid electrolyte material. A ratio of the flat cathode active material having a short axis direction corresponding to the thickness direction of the cathode active material layer is 30% or more with respect to the whole cathode active material.

The corresponding may signify an angle of the short axis direction of the flat cathode active material to the thickness direction of the cathode active material is 25° or less.

The aspect ratio may be 3 or less.

The hollowness may be in a range of 1% to 10%.

A concentration of the flat cathode active material in the cathode active material layer may be in a range of 40% to 99% by volume.

A relative density of the cathode active material layer may be in a range of 80% to 100%.

A thickness of the cathode active material layer may be in a range of 0.1 µm to 1000 µm.[0015]

In another embodiment, there is provided an all solid lithium battery comprising a cathode active material layer according to the first embodiment, an anode active material layer, and a solid electrolyte layer formed between the cathode active material layer and the anode active material layer.

A thickness of the anode active material layer may be in a range of 0.1 µm to 1000 µm.

In another embodiment, there is provided a method of manufacturing a cathode active material layer for use in an all solid lithium battery. The method comprises forming a mixture layer containing a hollow cathode active material with a hollowness of 20% or more and a solid electrolyte material, and pressing the mixture layer in a thickness direction to form a flat cathode active material with a hollowness in a range of more than 0% to 10% out of the hollow cathode active material.

The flat cathode active material may have an aspect ratio (long axis length/short axis length) of 1.5 or more in a section in a thickness direction of the cathode active material layer, and a ratio of the flat cathode active material having a short axis direction corresponding to the thickness direction of the cathode active material layer may be 30% or more with respect to the whole cathode active material.

The corresponding may signify an angle of the short axis direction of the flat cathode active material to the thickness direction of the cathode active material is 25° or less.

The aspect ratio may be 3 or less.

The flat cathode active material may be an oxide active material and the solid electrolyte material may be a sulfide solid electrolyte material, and a coat layer containing an Li ion conductive oxide may be formed on a surface of the flat cathode active material.

An average thickness of the coat layer may be in a range of 0.1 nm to 100 nm.

Pressing the mixture layer may include heating the mixture layer.

An average particle diameter ($D_{50}$) of the hollow cathode active material may be in a range of 0.1 µm to 20 µm.

Pressing the mixture layer may include flat pressing at a pressure in a range of 800 MPa to 3000 MPa.

Pressing the mixture layer may include roll pressing at a pressure in a range of 1.5 ton/cm to 10 ton/cm.

The mixture layer may be heated at a temperature in a range of 140° C. to 220° C.

Advantageous Effects

The cathode active material layer of the disclosed embodiments produces the effect such that internal resistance is low.

DETAILED DESCRIPTION

A cathode active material layer, an all solid lithium battery and a method of manufacturing the cathode active material layer of the disclosed embodiments are hereinafter described in detail.

A. Cathode Active Material Layer

The cathode active material layer of the disclosed embodiments is a cathode active material layer used for an all solid lithium battery, comprising a flat cathode active material with a hollowness of more than 0% and 10% or less, and a solid electrolyte material, in which the flat cathode active material has an aspect ratio (long axis length/short axis length) of 1.5 or more in a section in a thickness direction of the cathode active material layer, and a ratio of the flat cathode active material of which the short axis direction corresponds to a thickness direction of the cathode active material layer is 30% or more with respect to the whole cathode active material.

According to the disclosed embodiments, the flat cathode active material having a specific aspect ratio is provided and a ratio of the flat cathode active material of which the short axis direction corresponds to a thickness direction of the cathode active material layer is large, so as to allow the cathode active material layer to have low internal resistance. Such a cathode active material layer may be obtained by pressing so strongly as to crush a cathode active material having a hollow structure (a hollow cathode active material).

Figure 1A:
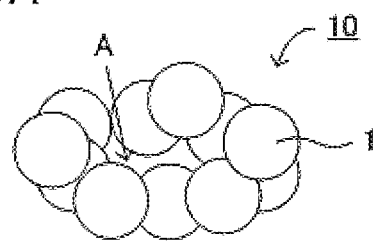
FIGS. 1A and 1B are schematic sectional views explaining a flat cathode active material according to an embodiment.
Figure 1B:
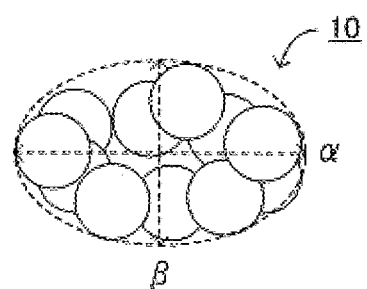

Here, FIG. 1A is a schematic sectional view explaining the flat cathode active material in the disclosed embodiments. As shown in FIG. 1A, a flat cathode active material 10 is secondary particles in which plural primary particles 1 aggregate, and the sectional shape of the cathode active material layer in a thickness direction is elliptical. In addition, the flat cathode active material 10 shown in FIG. 1A has a shell part composed of the plural primary particles 1 and a hollow part A formed inside the shell part. Also, as shown in FIG. 1B, the outer periphery of the active material is approximated to an ellipse. Then, the outer periphery of the active material and the ellipse are approximated so as to correspond as much as possible. The flat cathode active material 10 signifies a cathode active material such that an area of the active material included in the approximated ellipse is 90% or more and an aspect ratio ($\alpha/\beta$) of long axis length $\alpha$ to short axis length $\beta$ is 1.5 or more. However, an area of the hollow part A is not considered for measuring an area of the active material included in the approximated ellipse, and it is assumed that the hollow part A is filled with the active material.

Figure 2:
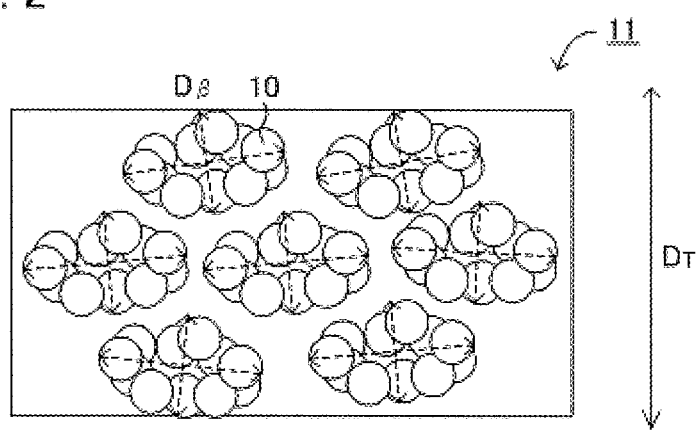
FIG. 2 is a schematic sectional view explaining a cathode active material layer according to an embodiment.

Also, in the disclosed embodiments, a ratio of the flat cathode active material of which the short axis direction corresponds to a thickness direction of the cathode active material layer is large. Specifically, as shown in FIG. 2, the short axis direction of the flat cathode active material 10 is regarded as $D_\beta$ and a thickness direction of the cathode active material layer is regarded as $D_T$. The relationship between the short axis direction $D_\beta$ to a thickness direction $D_T$ of the cathode active material layer 11 is such that an angle between $D_\beta$ and $D_T$ is 25° or less.

Figure 3A:
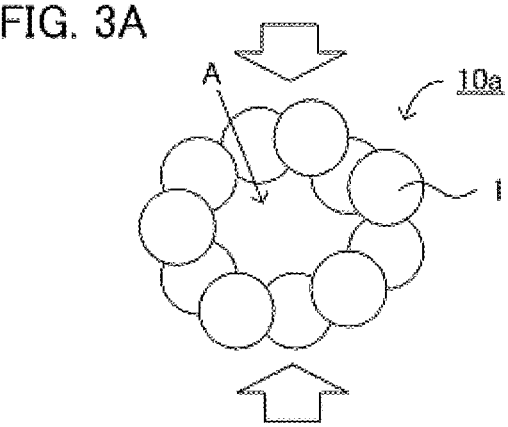
FIGS. 3A and 3B are schematic sectional views explaining a change in a cathode active material by pressing.
Figure 3B:
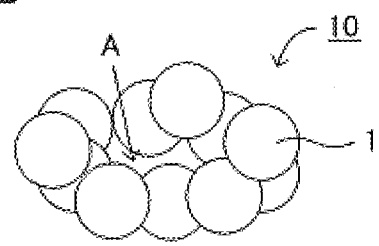

Also, the cathode active material layer of the disclosed embodiments may be obtained by pressing so strongly as to crush the hollow cathode active material. Specifically, as shown in FIG. 3A, pressing so as to crush a hollow cathode active material 10a is performed for the hollow cathode active material 10a having the hollow part A in a thickness direction of the cathode active material layer. Thus, as shown in FIG. 3B, the flat cathode active material 10 is formed. Such pressing increases a ratio of the flat cathode active material of which the short axis direction corresponds to a thickness direction of the cathode active material layer. Also, at least part of plural flat cathode active materials 10 contained in the cathode active material layer is the active material having the hollow part A, and the flat cathode active material 10 not having the hollow part A may exist. The reason therefor is that the hollow part of the flat cathode active material occasionally disappears by pressing strongly.

Incidentally, in the case of forming the cathode active material layer while using a cathode active material not having a hollow structure (a solid cathode active material), the flat cathode active material having the hollow part as the disclosed embodiments is not obtained. Also, provisionally, in the case of forming the cathode active material layer by a general slurry method while using the flat cathode active material having the hollow part, the short axis direction of the flat cathode active material in the cathode active material layer becomes random. Thus, a ratio of the flat cathode active material of which the short axis direction corresponds to a thickness direction of the cathode active material layer never increases.

The cathode active material layer of the disclosed embodiments is hereinafter described in each constitution.

1. Flat Cathode Active Material

The flat cathode active material in the disclosed embodiments is ordinarily secondary particles in which plural primary particles aggregate, and the sectional shape of the cathode active material layer in a thickness direction is elliptical. The hollowness of the flat active material is ordinarily more than 0% and may be 1% or more, or 3% or more. On the other hand, the hollowness of the flat active material is ordinarily 10% or less and may be 7% or less. The hollowness of the flat active material is obtained as an average value from a sectional image of the cathode active material layer in a thickness direction.

Each hollowness is calculated from an area of the hollow part to an area of the approximated ellipse. The number of samples is ordinarily 10 or more, preferably 100 or more. Incidentally, on the occasion of producing a test portion of the hollowness, a sectional image of the cathode active material layer in a thickness direction may be prepared by plurality along a depth direction of the cathode active material layer. The hollowness may be obtained by using an optional one of the plural sectional images; however, the hollowness is preferably obtained by using the plural sectional images. Incidentally, the sectional images are preferably subject to image processing classified into each region of a cathode active material, a solid electrolyte material, a void inside the cathode active material (a hollow part), a void between the cathode active material and the solid electrolyte material, and a conductive material.

The aspect ratio (long axis length/short axis length) of the flat cathode active material is ordinarily 1.5 or more and may be 1.6 or more, or 1.7 or more. On the other hand, the aspect ratio (long axis length/short axis length) of the flat cathode active material is 3 or less, for example, and may be 2.5 or less. The aspect ratio of the flat cathode active material is obtained as an average value from the approximated ellipse. Each aspect ratio is calculated from a ratio of the long axis length to the short axis length in the approximated ellipse. The number of samples is ordinarily 10 or more, preferably 100 or more. Incidentally, similarly to the above, the aspect ratio may be obtained by using an optional one of the plural sectional images; however, the aspect ratio is preferably obtained by using the plural sectional images.

In the disclosed embodiments, as shown in FIG. 2 described above, a ratio of the flat cathode active material of which the short axis direction corresponds to a thickness direction of the cathode active material layer is large. This ratio of the flat cathode active material to the whole cathode active material (all cathode active materials contained in the cathode active material layer) is ordinarily 30% or more and may be 40% or more. On the other hand, the ratio of the flat cathode active material to the whole cathode active material is 90% or less, for example. The ratio of the flat cathode active material to the whole cathode active material satisfies the preferable range, so that a further high effect of the reduction of internal resistance may be obtained. The ratio is obtained as an average value from a sectional image of the cathode active material layer in a thickness direction. Each ratio is regarded as a ratio of the flat cathode active material of which the short axis direction corresponds to a thickness direction of the cathode active material layer, with respect to the whole cathode active material in one sheet of a sectional image. The number of samples is ordinarily 10 or more, preferably 100 or more.

The flat cathode active material in the disclosed embodiments is preferably an oxide active material. The oxide active material contains at least oxygen and preferably further contains a transition metal. Examples of the transition metal include at least one of Co, Mn, Ni, V, Cr and Fe. Among them, the oxide active material preferably contains at least one of Co, Mn and Ni. Also, the oxide active material may contain all of Co, Mn and Ni. Also, the oxide active material preferably contains lithium. Examples of the flat cathode active material include rock salt bed type active materials such as $LiCoO_2$, $LiNiO_2$, $LiCo_{1/3}Ni_{1/3}Mn_{1/3}O_2$, $LiVO_2$ and $LiCrO_2$, spinel type active materials such as $LiMn_2O_4$, $Li(Ni_{0.25}Mn_{0.75})_2O_4$, $LiCoMnO_4$ and $Li_2NiMn_3O_8$, olivine type active materials such as $LiCoPO_4$, $LiMnPO_4$ and $LiFePO_4$, and NASICON type active materials such as $Li_3V_2P_3O_{12}$.

The flat cathode active material preferably has a coat layer composed of an ion conductive oxide. The reason therefor is to allow the flat cathode active material and the solid electrolyte material to be inhibited from reacting. Examples of the ion conductive oxide include a compound represented by a general formula $Li_xAO_y$ (therein, A is B, C, Al, Si, P, S, Ti, Zr, Nb, Mo, Ta or W, and x and y are positive numbers). Specific examples include $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2MoO_4$ and $Li_2WO_4$. The average thickness of the coat layer is, for example, in a range of 0.1 nm to 100 nm, preferably in a range of 1 nm to 20 nm.

2. Solid Electrolyte Material

The solid electrolyte material in the disclosed embodiments is not particularly limited as long as the solid electrolyte material is a material having Li ion conductivity, and examples thereof include inorganic solid electrolyte materials such as a sulfide solid electrolyte material, an oxide solid electrolyte material, a nitride solid electrolyte material and a halide solid electrolyte material. Also, the hardness of the solid electrolyte material is preferably the hardness or less of the flat cathode active material. The reason therefor is that the solid electrolyte material is crushed so that the interface contact with the cathode active material may be improved. The hardness of the solid electrolyte material and the flat cathode active material may adopt Vickers hardness, for example.

Examples of the sulfide solid electrolyte material include $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (m and n are positive numbers, Z is any of Ge, Zn and Ga.), $Li_2S$—$GeS_2$, $Li_2S$—$SiS_2$—$Li_3PO_4$, $Li_2S$—$SiS_2$—$Li_xMO_y$ (x and y are positive numbers, M is any of P, Si, Ge, B, Al, Ga and In.), and $Li_{10}GeP_2S_{12}$.

In particular, the sulfide solid electrolyte material is preferably provided with an ion conductor containing Li, A (A is at least one kind of P, Si, Ge, Al and B) and S. In addition, the ion conductor preferably has an anion structure of an ortho-composition ($PS_4^{3-}$ structure, $SiS_4^{4-}$ structure, $GeS_4^{4-}$ structure, $AlS_3^{3-}$ structure and $BS_3^{3-}$ structure) as the main component of the anion. The reason therefor is to allow the sulfide solid electrolyte material with high chemical stability. The ratio of an anion structure of an ortho-composition is preferably 70 mol % or more, more preferably 90 mol % or more with respect to all anion structures in the ion conductor. The ratio of an anion structure of an ortho-composition may be determined by Raman spectroscopy, NMR and XPS.

The sulfide solid electrolyte material preferably contains at least one of LiI, LiBr and LiCl in addition to the ion conductor. At least part of LiI, LiBr and LiCl ordinarily exist in a state of being incorporated into the structure of the ion conductor as LiI component, LiBr component and LiCl component respectively. Also, the sulfide solid electrolyte material may have or may not have a peak of LiI in X-ray diffraction measurement; however, the latter is preferable. The reason therefor is to be high in Li ion conductivity. This point is the same also with regard to LiBr and LiCl. The ratio of LiX (X═I, Cl and Br) in the sulfide solid electrolyte material is, for example, within a range of 10 mol % to 30 mol %, preferably within a range of 15 mol % to 25 mol %. The ratio of LiX signifies the total ratio of LiX contained in the sulfide solid electrolyte material.

Examples of the oxide solid electrolyte material include $Li_2O-B_2O_3-P_2O_5$, $Li_2O-SiO_2$, LiLaTaO (such as $Li_5La_3Ta_2O_{12}$), LiLaZrO (such as $Li_7La_3Zr_2O_{12}$), LiBaLaTaO (such as $Li_6BaLa_2Ta_2O_{12}$), $Li_{1+x}Si_xP_{1-x}O_4$ ($0 \leq x < 1$, such as $Li_{3.6}Si_{0.6}P_{0.4}O_4$), $Li_{i+x}Al_xGe_{2-x}(PO_4)_3$ ($0 \leq x \leq 2$), $Li_{1+x}Al_xTi_{2-x}(PO_4)_3$ ($0 \leq x \leq 2$), and $Li_3PO_{(4-3/2x)}N_x$ ($0 \leq x < 1$). Also, examples of the nitride solid electrolyte material include $Li_3N$, and examples of the halide solid electrolyte material include LiI.

The solid electrolyte material in the disclosed embodiments may be a crystalline material or an amorphous material. Also, the solid electrolyte material may be glass or crystallized glass (glass ceramics). Examples of a manufacturing method of the glass include a method for subjecting a raw material composition to amorphization treatment. Examples of the amorphization treatment include a melt quenching and a mechanical milling method. Examples of a manufacturing method of the crystallized glass include a method for heating the glass at a temperature of crystallization temperature or higher. Also, examples of a manufacturing method of the crystalline material include a method for heating a raw material composition in a state of solid (a solid phase method).

The shape of the solid electrolyte material is not particularly limited but examples thereof include a spherical shape. The average particle diameter ($D_{50}$) of the solid electrolyte material is, for example, 0.1 μm or more and may be 0.5 μm or more. On the other hand, the average particle diameter ($D_{50}$) of the solid electrolyte material is, for example, 50 μm or less and may be 10 μm or less. Also, Li ion conductance of the solid electrolyte material at 25° C. is, for example, $1 \times 10^{-5}$ S/cm or more, preferably $1 \times 10^{-4}$ S/cm or more, more preferably $1 \times 10^{-3}$ S/cm or more.

The ratio of the solid electrolyte material in the cathode active material layer is, for example, 1 volume % or more, preferably 10 volume % or more. Too low ratio of the solid electrolyte material brings a possibility of not sufficiently improving Li ion conductivity of the cathode active material layer. On the other hand, the ratio of the solid electrolyte material in the cathode active material layer is, for example, 60 volume % or less, preferably 50 volume % or less. Too high ratio of the solid electrolyte material lowers the ratio of the cathode active material relatively to bring a possibility of decreasing battery capacity. Also, in the cathode active material layer, the ratio of the solid electrolyte material is preferably lower than the ratio of the cathode active material.

3. Cathode Active Material Layer

The cathode active material layer of the disclosed embodiments contains at least a cathode active material and a solid electrolyte material. The ratio of the cathode active material in the cathode active material layer is, for example, 40 volume % or more, preferably 50 volume % or more. Too low ratio of the cathode active material brings a possibility of decreasing battery capacity. On the other hand, the ratio of the cathode active material in the cathode active material layer is, for example, 99 volume % or less, preferably 90 volume % or less. Too high of a ratio of the cathode active material brings a possibility of decreasing Li ion conductivity of the cathode active material layer.

The cathode active material layer may further contain a conductive material. The addition of the conductive material allows electron conduction of the cathode active material layer to be improved. Examples of the conductive material include carbon materials such as acetylene black (AB), Ketjen Black (KB), vapor growth carbon fiber (VGCF), carbon nanotube (CNT) and carbon nanofiber (CNF).

The cathode active material layer may further contain a binder. The addition of the binder allows moldability of the cathode active material layer to be improved. Examples of the binder include acrylic binders, fluorine-containing binders such as PVDF and PTFE, and rubber binders such as butadiene rubber. Also, the rubber binders may be such as to hydrogenate, or such as to hydrogenate and introduce a functional group into a terminal.

The relative density of the cathode active material layer is, for example, 80% or more, preferably 90% or more. On the other hand, the relative density of the cathode active material layer is ordinarily 100% or less. The relative density of the cathode active material layer may be obtained by dividing the actual density of the cathode active material layer by the theoretical density of the cathode active material layer. Incidentally, the actual density of the cathode active material layer may be obtained in such a manner that the volume of the cathode active material layer is obtained from the area and membrane thickness of the cathode active material layer to divide the weight of the cathode active material layer by the volume. The theoretical density of the cathode active material layer may be obtained from the density and ratio of components. Also, the thickness of the cathode active material layer is, for example, in a range of 0.1 μm to 1000 μm, and preferably in a range of 0.1 μm to 300 μm.

B. All Solid Lithium Battery

Figure 4:
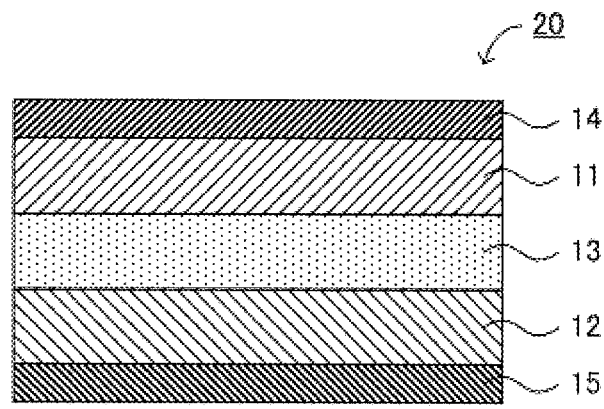
FIG. 4 is a schematic sectional view showing an example of an all solid lithium battery according to an embodiment.

FIG. 4 is a schematic sectional view showing an example of an all solid lithium battery of the disclosed embodiments. The all solid lithium battery 20 in FIG. 4 comprises a cathode active material layer 11, an anode active material layer 12, a solid electrolyte layer 13 formed between the cathode active material layer 11 and the anode active material layer 12, a cathode current collector 14 for collecting the cathode active material layer 11, and an anode current collector 15 for collecting the anode active material layer 12. In the disclosed embodiments, the cathode active material layer 11 has a characteristic such as to be the cathode active material layer described above.

According to the disclosed embodiments, the use of the cathode active material layer described above allows the high-output all solid lithium battery.

The all solid lithium battery of the disclosed embodiments is hereinafter described in each constitution.

1. Cathode Active Material Layer

The cathode active material layer in the disclosed embodiments is the same as the contents described in the "A. Cathode active material layer".

2. Anode Active Material Layer

The anode active material layer in the disclosed embodiments is a layer containing at least the anode active material, and may further contain at least one of a solid electrolyte material, a conductive material and a binder as required. The solid electrolyte material, conductive material and binder are the same as the contents described in the "A. Cathode active material layer".

Examples of the anode active material include a carbon active material, a metal active material and an oxide active material. Examples of the carbon active material include graphite, hard carbon and soft carbon. Examples of the metal active material include In, Al, Si, Sn and alloys containing at least these. Examples of the oxide active material include metallic oxides such as $Nb_2O_5$, SiO, $V_2O_5$ and $MoO_3$, and lithium titanate such as $Li_4Ti_5O_{12}$.

The thickness of the anode active material layer is, for example, in a range of 0.1 μm to 1000 μm, and preferably in a range of 0.1 μm to 300 μm.

3. Solid Electrolyte Layer

The solid electrolyte layer in the disclosed embodiments is a layer formed between the cathode active material layer and the anode active material layer. The solid electrolyte layer is a layer containing at least a solid electrolyte material, and may further contain a binder as required. Kinds of the solid electrolyte material are not particularly limited but are preferably a sulfide solid electrolyte material. The solid electrolyte material and binder are the same as the contents described in the "A. Cathode active material layer".

The ratio of the solid electrolyte material contained in the solid electrolyte layer is, for example, in a range of 10 volume to 100 volume %, and preferably in a range of 50 volume % to 100 volume %. The thickness of the solid electrolyte layer is, for example, in a range of 0.1 μm to 1000 μm, and preferably in a range of 0.1 μm to 300 μm. Also, examples of a forming method for the solid electrolyte layer include a method for compression-molding the solid electrolyte material.

4. Other Constitutions

The all solid lithium battery of the disclosed embodiments comprises at least the cathode active material layer, anode active material layer and solid electrolyte layer described above, ordinarily further comprising a cathode current collector for collecting the cathode active material layer and an anode current collector for collecting the anode active material layer. Examples of a material for the cathode current collector include SUS, Ni, Cr, Au, Pt, Al, Fe, Ti and Zn. On the other hand, examples of a material for the anode current collector include SUS, Cu, Ni, Fe, Ti, Co and Zn. Also, in the disclosed embodiments, an optional battery case such as a battery case made of SUS may be used.

5. All Solid Lithium Battery

The all solid lithium battery of the disclosed embodiments may be a primary battery or a secondary battery, preferably a secondary battery. The reason therefor is to be repeatedly charged and discharged and be useful as a car-mounted battery, for example. Examples of the shape of the all solid lithium battery include a coin shape, a laminate shape, a cylindrical shape and a rectangular shape.

C. Manufacturing Method of Cathode Active Material Layer

Figure 5A:
FIGS. 5A to 5C are schematic sectional views showing an example of a manufacturing method of a cathode active material layer according to an embodiment.
Figure 5B:
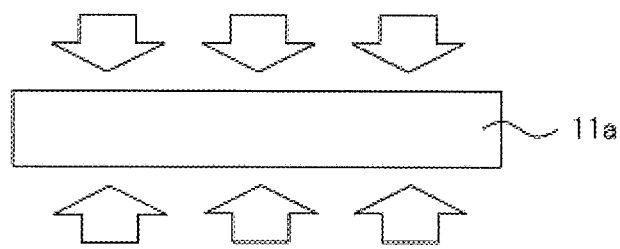
Figure 5C:
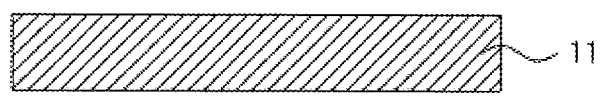

FIGS. 5A to 5C are schematic sectional views showing an example of a method of manufacturing a cathode active material layer of the disclosed embodiments. In FIGS. 5A to 5C, first, a mixture layer 11a containing a hollow cathode active material with a hollowness of 20% or more and a solid electrolyte material is formed (FIG. 5A). Next, the mixture layer 11a is pressed in a thickness direction to form a flat cathode active material having a predetermined hollowness out of the hollow cathode active material (FIG. 5B). Thus, a cathode active material layer 11 used for an all solid lithium battery is obtained (FIG. 5C).

According to the disclosed embodiments, pressing so strongly as to crush the hollow cathode active material allows the cathode active material layer with low internal resistance. Without intending to be bound by theory, the reason that the internal resistance of the cathode active material layer is decreased is believed to be that the cathode active material layer is further densified. In the disclosed embodiments, the hollow cathode active material is crushed so positively that pressure is easily conducted to the solid electrolyte material and the cathode active material layer is further densified. As a result, it is believed that Li ion conduction paths of the cathode active material layer are increased to allow internal resistance to be decreased.

For example, in the case of a cathode active material not having a hollow structure (a solid cathode active material), it is assumed that sufficient pressure is not conducted to the solid electrolyte material located in the neighborhood of the adjacent solid cathode active material even though the solid cathode active material is pressed. More specifically, it is assumed that sufficient pressure is not conducted to the solid electrolyte material located in the neighborhood of the contact point though much pressure is applied to the contact point of the adjacent solid cathode active material. In contrast, in the disclosed embodiments, the hollow cathode active material is crushed, so that sufficient pressure is conducted to the solid electrolyte material located in the neighborhood of the contact point of the hollow cathode active material and the cathode active material layer is further densified.

Incidentally, far larger pressure than the case of crushing the hollow cathode active material is necessary for crushing the solid cathode active material. Also, provisionally, in the case of crushing the solid cathode active material by applying greatly large pressure, the solid cathode active material is crushed so randomly as to control the shape of the active material with difficulty. On the other hand, in the case of crushing the hollow cathode active material, the hollow part is crushed along the pressing direction, so as to control the shape of the active material with ease. Also, for example, in the case of using the oxide active material and the sulfide solid electrolyte material, a coat layer containing a Li ion conductive oxide is frequently provided on a surface of the oxide active material for inhibiting both of them from reacting. The solid cathode active material is crushed so randomly as to cause a crack and thereby form the active material surface easily, on which the coat layer is not formed. In contrast, the hollow cathode active material is crushed so regularly as to have the advantage that the active material surface on which the coat layer is not formed is formed with difficulty. Incidentally, the coat layer is the same as the contents described in the "A. Cathode active material layer".

Also, the hollow cathode active material is occasionally used for a battery using liquid electrolyte. The reason therefor is that liquid electrolyte in the battery using liquid electrolyte may penetrate into the hollow part of the cathode active material to secure Li ion conductivity. In contrast, in an all solid state battery, the solid electrolyte material may not penetrate into the hollow part of the cathode active material. Thus, Li ion conductivity of the hollow part may not be secured. Accordingly, the hollow cathode active material is guessed to be disadvantageous to performance improvement of the all solid lithium battery. In contrast, in the disclosed embodiments, pressing so strongly as to crush the hollow cathode active material allows a different effect of densification.

A method of manufacturing the cathode active material layer of the disclosed embodiments is hereinafter described in each step.

1. Mixture Layer Forming Step

The mixture layer forming step in the disclosed embodiments is a step of forming a mixture layer containing a hollow cathode active material with a hollowness of 20% or more and a solid electrolyte material.

The hollow cathode active material with a hollowness of 20% or more is ordinarily used for the mixture layer. On the other hand, the hollowness of the hollow cathode active material is 40% or less, for example. The shape of the hollow cathode active material is not particularly limited but examples thereof include a spherical shape. With regard to the hollow cathode active material, the aspect ratio (long axis length/short axis length) is preferably 1.3 or less. The average particle diameter ($D_{50}$) of the hollow cathode active material is, for example, 0.1 μm or more, preferably 1 μm or more. On the other hand, the average particle diameter ($D_{50}$) of the hollow cathode active material is, for example, 20 μm or less, preferably 10 μm or less.

A method of manufacturing the hollow cathode active material is not particularly limited, but the hollowness of the hollow cathode active material may be controlled by properly adjusting the synthesis conditions of a hydroxide as a precursor of the hollow cathode active material. A relation between the synthesis conditions of a hydroxide and the hollowness is not uniquely determined; for example, lower concentration of a complexing agent used in a coprecipitation method tends to bring larger hollowness. The required concentration of a complexing agent depends on the composition and average particle diameter of an intended hydroxide. Thus, the concentration of a complexing agent is properly determined in accordance with various kinds of properties of the intended hydroxide. Ammonia water and ammonium carbonate may be selected as the complexing agent. An obtained hydroxide precursor, a lithium compound and another raw material compound as required are mixed by a known method, and the obtained mixture is burned by a known method to allow an intended hollow cathode active material. The burning temperature depends on factors such as the composition of hollow cathode active material, but may be approximately in a range of 850° C. to 1000° C., for example.

The mixture layer ordinarily contains the hollow cathode active material and the solid electrolyte material, and may further contain at least one of a conductive material and a binder. These materials and ratios thereof are the same as the contents described in the "A. Cathode active material layer".

A formation method for the mixture layer is not particularly limited but examples thereof include a slurry method. With regard to the slurry method, slurry is coated and dried on a substrate to allow a cathode active material layer. Examples of a preparation method for the slurry include a method for kneading the hollow cathode active material and the solid electrolyte material in a dispersion medium.

The dispersion medium preferably has aprotic properties such as not to react with a coarse-grained material, and examples thereof include polar aprotic liquid and nonpolar aprotic liquid. Examples of the polar aprotic liquid include ketones such as acetone; nitriles such as acetonitrile; amides such as N,N-dimethylformamide (DMF); and sulfoxides such as dimethyl sulfoxide (DMSO).

Examples of the nonpolar aprotic liquid include alkane which is liquid at normal temperature (25° C.). Specific examples thereof include, but are not limited to, chain alkane such as pentane, hexane, heptane, octane, nonane, decane, undecane, dodecane and paraffin, and cycloalkane such as cyclopentane, cyclohexane, cycloheptane, cyclooctane and cycloparaffin.

Other examples of the nonpolar aprotic liquid include, but are not limited to, aromatic hydrocarbons such as benzene, toluene and xylene; chain ethers such as diethyl ether and dimethyl ether; cycloethers such as tetrahydrofuran; alkyl halides such as chloroform, methyl chloride and methylene chloride; esters such as ethyl acetate; and fluorine compounds such as benzene fluoride, heptane fluoride, 2,3-dihydroperfluoropentane and 1,1,2,2,3,3,4-heptafluorocyclopentane.

Examples of a kneading method include general methods such as ultrasonic homogenizer, shaker, thin-film rotary mixer, dissolver, homomixer, kneader, roll mill, sand mill, attritor, ball mill, vibrator mill and high-speed impeller mill. Examples of a coating method include general methods such as a doctor blade method, a die coating method, a gravure coating method, a spray coating method, an electrostatic coating method and a bar coating method. Examples of a dry method include general methods such as warm-air or hot-air drying, infrared drying, reduced-pressure drying and dielectric heat drying.

2. Pressing Step

The pressing step in the disclosed embodiments is a step of pressing the mixture layer in a thickness direction to form a flat cathode active material with a hollowness in a range of more than 0% and 10% or less out of the above-mentioned hollow cathode active material. Thus, a cathode active material layer is obtained from the mixture layer.

Examples of a method for applying pressure to the mixture layer include flat pressing and roll pressing. For example, in the case of applying surface pressure by flat pressing, pressure applied to the mixture layer is, for example, 800 MPa or more, preferably 1000 MPa or more, and preferably 1200 MPa or more. On the other hand, pressure applied to the mixture layer is, for example, 3000 MPa or less, and may be 2500 MPa or less. Meanwhile, for example, in the case of applying linear pressure by roll pressing, pressure applied to the mixture layer is, for example, 1.5 ton/cm or more, and preferably 2 ton/cm or more. On the other hand, pressure applied to the mixture layer is, for example, 10 ton/cm or less. The pressing time is, for example, in a range of 1 minute to 100 hours. Incidentally, the pressing step may be performed for only the mixture layer, or a laminated body provided with the mixture layer and another layer (such as a solid electrolyte layer and a mixture layer for an anode active material layer).

Also, in the pressing step, the mixture layer is preferably heated. Pressing and heating simultaneously allow the solid electrolyte material to be pressed in a state softened by heating, so that the contact area between the cathode active material and the solid electrolyte material increases. As a result, the cathode active material layer may be densified and internal resistance may be further decreased.

The heating temperature is, for example, in a range of 140° C. to 220° C., preferably in a range of 150° C. to 200° C. Also, the heating temperature may be a temperature less than crystallization temperature of the solid electrolyte material, or a temperature of crystallization temperature or more of the solid electrolyte material. The heating method is not particularly limited but examples thereof include a method by using a burning furnace.

3. Others

The cathode active material layer obtained by the disclosed embodiments is the same as the contents described in the "A. Cathode active material layer". Also, the disclosed embodiments may provide a cathode active material layer having a characteristic such as to be obtained by the mixture layer forming step and pressing step described above. In addition, the disclosed embodiments may provide a method of manufacturing an all solid lithium battery having a characteristic such as to have a cathode active material layer forming step of forming a cathode active material layer by the mixture layer forming step and pressing step described above.

Incidentally, embodiments are not limited to the disclosed embodiments. The disclosed embodiments are exemplification, and other variations are intended to be included in the technical scope of the disclosed embodiments if they have substantially the same constitution as the technical idea described in disclosed embodiments and have similar operation and effect thereto.

EXAMPLES

The disclosed embodiments are described more specifically with reference to the examples below.

Comparative Example 1

(Production of Sulfide Solid Electrolyte Material)

Weighed were $Li_2S$ (manufactured by Nippon Chemical Industrial CO., LTD.), $P_2S_5$ (manufactured by Sigma-Aldrich Co. LLC.), LiI (manufactured by NIPPOH CHEMICALS CO., LTD.) and LiBr (manufactured by Kojundo Chemical Lab. Co., Ltd.) so as to satisfy a composition of $10LiI\cdot15LiBr\cdot75(0.75Li_2S\cdot0.25P_2S_5)$ and mixed with an agate mortar for 5 minutes. Projected was 2 g of the mixture into a vessel of planetary ball mill (45 cc, made of $ZrO_2$), dehydrated heptane (a moisture amount of 30 ppm or less, 4 g) was projected thereinto, and a $ZrO_2$ ball $(\phi)=5$ mm, 53 g) was projected thereinto to hermetically seal the vessel completely. This vessel was mounted on a planetary ball mill machine (P7™ manufactured by FRITSCH JAPAN CO, LTD.) to perform mechanical milling at the number of soleplate revolutions of 500 rpm for 20 hours. Thereafter, the heptane was removed by drying at 110° C. for 1 hour to obtain a coarse-grained material of a sulfide solid electrolyte material.

Thereafter, the obtained coarse-grained material was atomized. Dehydrated heptane and dibutyl ether were mixed into the coarse-grained material and adjusted so as to be a total weight of 10 g and a solid content concentration of 10 wt %. The obtained mixture was projected into a vessel of planetary ball mill (45 cc, made of $ZrO_2$), and a $ZrO_2$ ball ($\phi=0.3$ mm, 40 g) was projected thereinto to hermetically seal the vessel completely. This vessel was mounted on a planetary ball mill machine (P7™ manufactured by FRITSCH JAPAN CO, LTD.) to perform mechanical milling at the number of soleplate revolutions of 150 rpm for 20 hours. Thereafter, an amorphous sulfide solid electrolyte material ($D_{50}=0.8$ μm) was obtained by drying. The amorphous sulfide solid electrolyte material was burned at 200° C. to obtain a sulfide solid electrolyte material as glass ceramics.

(Production of Cathode)

The obtained sulfide solid electrolyte material ($D_{50}=0.8$ μm), $LiCo_{1/3}Ni_{1/3}Mn_{1/3}O_2$ ($D_{50}=4$ μm, hollowness=0%) having a coat layer (lithium niobate, an average thickness of 7 nm) on the surface as a cathode active material, and vapor growth carbon fiber (registered trademark VGCF, manufactured by Showa Denko K.K.) as a conductive material were weighed by 20.5 parts by weight, 100 parts by weight and 2.0 parts by weight respectively, and dispersed into butyl butyrate as a dispersion medium. In addition, PVDF solution (PVDF:butyl butyrate=5:95, weight ratio) as a binder was added so that PVDF was 2.0 parts by weight. The obtained mixture was put in a vessel, dispersed by an ultrasonic dispersing device (UH-50™, manufactured by SMT Corporation) for 30 seconds, and subsequently shaken by a shaker (TTM-1™, manufactured by SIBATA SCIENTIFIC TECHNOLOGY LTD.) for 30 minutes to obtain cathode slurry.

The obtained cathode slurry was applied to a cathode current collector (carbon-coated aluminum foil, a thickness of 20 μm, SDX™ manufactured by Showa Denko K.K.) by a doctor blade method, made to stand still for 30 minutes, and dried at 100° C. for 30 minutes. The applied amount (texture amount) was adjusted so that a cathode active material layer after drying was 18.1 mg/cm². Thereafter, a cathode was obtained by cutting into a circular shape with an area of 1 cm².

(Production of Anode)

LiI—LiBr—$Li_2S$—$P_2S_5$ ($D_{50}=1.5$ μm) as a sulfide solid electrolyte material and graphite ($D_{50}=10$ μm, manufactured by Mitsubishi Chemical Corporation) as an anode active material were weighed by 67.3 parts by weight and 100 parts by weight respectively, and dispersed into butyl butyrate as a dispersion medium. In addition, PVDF solution (PVDF:butyl butyrate=5:95, weight ratio) as a binder was added so that PVDF was 3.0 parts by weight.

The obtained mixture was put in a vessel, dispersed by an ultrasonic dispersing device (UH-50™, manufactured by SMT Corporation) for 30 seconds, and subsequently shaken by a shaker (TTM-1™, manufactured by SIBATA Scientific Technology Ltd.) for 30 minutes to obtain anode slurry.

The obtained anode slurry was applied to an anode current collector (copper foil, a thickness of 10 μm) by a doctor blade method, made to stand still for 30 minutes, and dried at 100° C. for 30 minutes. The applied amount (texture amount) was adjusted so that an anode active material layer after drying was 13.7 mg/cm². Thereafter, an anode was obtained by cutting into a circular shape with an area of 1 cm².

(Production of Solid Electrolyte Layer)

LiI—LiBr—$Li_2S$—$P_2S_5$ ($D_{50}=2.5$ rim) as a sulfide solid electrolyte material was weighed by 100 parts by weight, and dispersed into heptane as a dispersion medium. In addition, BR solution (butylene rubber solution, BR:heptane=5:95, weight ratio) as a binder was added so that BR was 1.0 part by weight. Incidentally, the amount of the dispersion medium (heptane) was adjusted so that a solid content concentration was 39 wt %. The obtained mixture was put in a vessel, dispersed by an ultrasonic dispersing device (UH-50™, manufactured by SMT Corporation) for 30 seconds, and subsequently shaken by a shaker (TTM-1, manufactured by SIBATA Scientific Technology Ltd.) for 5 minutes to obtain slurry for forming a solid electrolyte layer.

The obtained slurry was applied to a substrate (aluminum foil), made to stand still for 5 minutes, and dried at 100° C. for 30 minutes. Thereafter, a solid electrolyte layer was obtained by cutting into a circular shape with an area of 1 cm² to peel off the substrate.

(Production of Battery)

The obtained cathode, solid electrolyte layer and anode were laminated in this order to form a laminated body. This laminated body was pressed at room temperature (25° C.) and a pressure of 600 MPa. The pressed laminated body was stored in a battery case to apply a confining pressure of 1.5 MPa. Thus, a battery was obtained.

Comparative Example 2

A battery was obtained in the same manner as Comparative Example 1 except for using a hollow cathode active material in which the hollowness was modified into 20%.

Example 1

A battery was obtained in the same manner as Comparative Example 1 except for using a hollow cathode active material in which the hollowness was modified into 20%, and roll pressing the laminated body at 160° C. and 2 ton/cm. Incidentally, the applied pressure corresponds to at least twice or more of Comparative Example 1 (600 MPa).

[Evaluations]

(SEM Measurement)

Figure 6A:
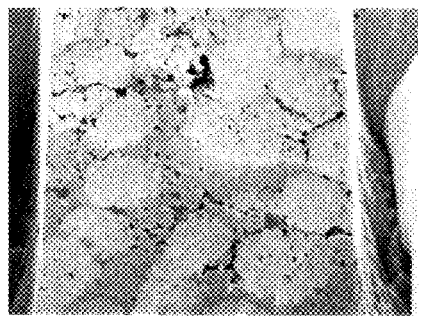
FIGS. 6A to 6C are SEM images of a cathode active material layer of batteries obtained in Comparative Examples 1 and 2 and Example 1.
Figure 6B:
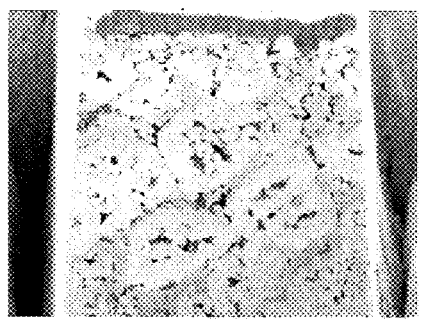
Figure 6C:
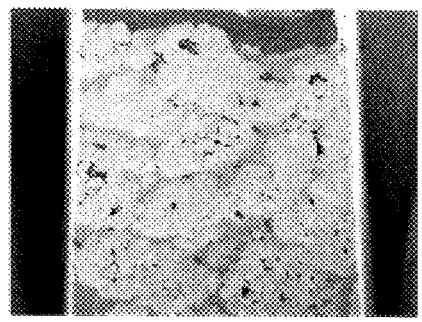

The section of the cathode active material layer of the battery each obtained in Comparative Examples 1 and 2 and Example 1 was observed by using SEM (scanning electron microscope). The results are shown in FIGS. 6A to 6C. As shown in FIGS. 6A to 6C, it was confirmed that Comparative Example 1 had no hollow parts and the cathode active material whose section was perfectly circular. It was confirmed that Comparative Example 2 had a hollow part and the cathode active material whose section was perfectly circular. In contrast, it was confirmed that Example 1 had a hollow part and the cathode active material whose section was elliptic.

Figure 7A:
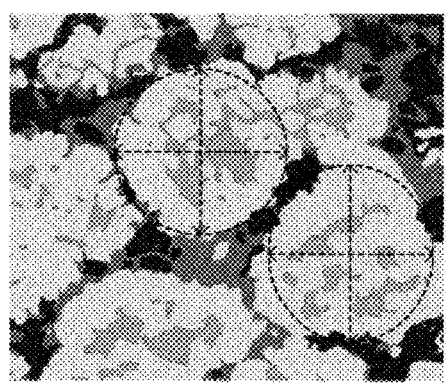
FIGS. 7A and 7B are views in which components are distinguished from each other in SEM images of a cathode active material layer of batteries obtained in Comparative Example 2 and Example 1.
Figure 7B:
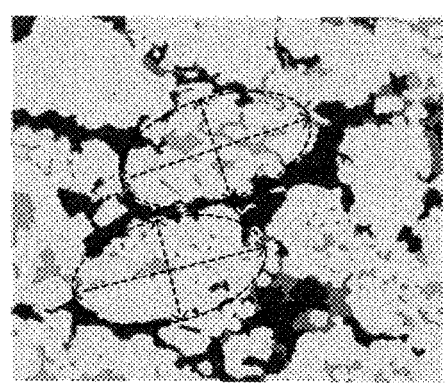

Also, the obtained SEM image was classified into each region of a cathode active material, a sulfide electrolyte material, a void inside the cathode active material (a hollow part), a void between the cathode active material and the sulfide solid electrolyte material, and a conductive material. The hollowness of the cathode active material after pressing was measured from the classified image. The typical examples of the classified image are shown in FIGS. 7A and 7B. As shown in FIGS. 7A and 7B, in Comparative Example 2, the cathode active material whose section was perfectly circular was confirmed. The aspect ratios of the cathode active material surrounded by a broken line were both approximately 1.0. In contrast, in Example 1, the cathode active material whose section was elliptic was confirmed. The aspect ratios of the cathode active material surrounded by a broken line were approximately 1.7 and approximately 1.9 respectively. The average of the aspect ratios of the flat cathode active material in Example 1 was 1.7. Also, in Example 1, a ratio of the flat cathode active material of which the short axis direction corresponds to a thickness direction of the cathode active material layer was 30% with respect to the whole cathode active material. The results of the hollowness of the cathode active material after pressing are shown in Table 1.

(Internal Resistance Measurement)

The battery obtained in Comparative Examples 1 and 2 and Example 1 was subjected to charge and discharge treatment and thereafter adjusted to a predetermined voltage to measure internal resistance. Specifically, the voltage was adjusted to 3.5 V, and thereafter discharge current was determined at 19.2 mA to perform constant-current discharge for 5 seconds. The internal resistance was measured from a relation between voltage drop amount and discharge current at this time. The results are shown in Table 1 and FIG. 8. Incidentally, the internal resistance ratio in Table 1 and FIG. 8 is a relative value in the case of regarding the internal resistance of Comparative Example 2 as 100%.

TABLE 1

| | HOLLOWNESS OF CATHODE ACTIVE MATERIAL (%) | | INTERNAL RESISTANCE RATIO (%) |
| --- | --- | --- | --- |
| | BEFORE PRESSING | AFTER PRESSING | |
| COMPARATIVE EXAMPLE 1 | 0 | 0 | 117 |
| COMPARATIVE EXAMPLE 2 | 20 | 19 | 100 |
| EXAMPLE 1 | 20 | 10 | 20 |

Figure 8:
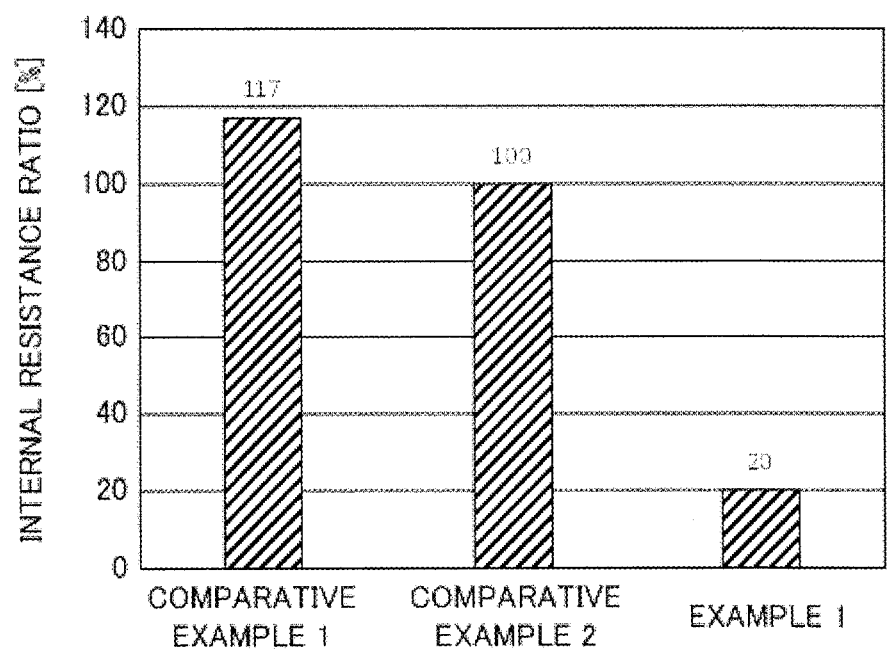
FIG. 8 is a result of measuring internal resistance of a battery each obtained in Comparative Examples 1 and 2 and Example 1.

As shown in Table 1 and FIG. 8, in Comparative Example 2, the hollowness of the cathode active material before and after pressing was approximately the same. In contrast, in Example 1, the hollowness of the cathode active material decreased to half by pressing. In Example 1, it was confirmed that the internal resistance decreased vastly as compared with Comparative Examples 1 and 2.

It will be appreciated that the above-disclosed features and functions, or alternatives thereof, may be desirably combined into different compositions, systems or methods. Also, various alternatives, modifications, variations or improvements may be subsequently made by those skilled in the art. As such, various changes may be made without departing from the spirit and scope of this disclosure.

What is claimed is:

1. A cathode active material layer for use in an all solid lithium battery, the active material layer comprising:
   a flat cathode active material having a hollowness in the range of more than 0% to 10% and an aspect ratio (long axis length/short axis length) of 1.5 or more in a section in a thickness direction of the cathode active material layer; and
   a solid electrolyte material,
   wherein a ratio of the flat cathode active material having a short axis direction corresponding to the thickness direction of the cathode active material layer is 30% or more with respect to the whole cathode active material.

2. The cathode active material layer according to claim 1, wherein the corresponding signifies an angle of the short axis direction of the flat cathode active material to the thickness direction of the cathode active material is 25° or less.

3. The cathode active material layer according to claim 1, wherein the aspect ratio is 3 or less.

4. The cathode active material layer according to claim 1, wherein the hollowness is in a range of 1% to 10%.

5. The cathode active material layer according to claim 1, wherein a concentration of the flat cathode active material in the cathode active material layer is in a range of 40% to 99% by volume.

6. The cathode active material layer according to claim 1, wherein a relative density of the cathode active material layer is in a range of 80% to 100%.

7. The cathode active material layer according to claim 1, wherein a thickness of the cathode active material layer is in a range of 0.1 μm to 1000 μm.

8. An all solid lithium battery comprising:
   a cathode active material layer according to claim 1;
   an anode active material layer; and
   a solid electrolyte layer formed between the cathode active material layer and the anode active material layer.

9. The all solid lithium battery according to claim 8, wherein a thickness of the anode active material layer is in a range of 0.1 μm to 1000 μm.

10. A method of manufacturing a cathode active material layer for use in an all solid lithium battery, the method comprising:
    forming a mixture layer containing a hollow cathode active material with a hollowness of 20% or more and a solid electrolyte material; and
    pressing the mixture layer in a thickness direction to form a flat cathode active material with a hollowness in a range of more than 0% to 10% out of the hollow cathode active material.

11. The method of manufacturing a cathode active material layer according to claim 10, wherein the flat cathode active material has an aspect ratio (long axis length/short axis length) of 1.5 or more in a section in a thickness direction of the cathode active material layer, and a ratio of the flat cathode active material having a short axis direction corresponding to the thickness direction of the cathode active material layer is 30% or more with respect to the whole cathode active material.

12. The method of manufacturing a cathode active material layer according to claim 10, wherein the corresponding signifies an angle of the short axis direction of the flat cathode active material to the thickness direction of the cathode active material is 25° or less.

13. The method of manufacturing a cathode active material layer according to claim 10, wherein the aspect ratio is 3 or less.

14. The method of manufacturing a cathode active material layer according to claim 10, wherein the flat cathode active material is an oxide active material and the solid electrolyte material is a sulfide solid electrolyte material, and a coat layer containing an Li ion conductive oxide is formed on a surface of the flat cathode active material.

15. The method of manufacturing a cathode active material layer according to claim 14, wherein an average thickness of the coat layer is in a range of 0.1 nm to 100 nm.

16. The method of manufacturing a cathode active material layer according to claim 10, wherein pressing the mixture layer includes heating the mixture layer.

17. The method of manufacturing a cathode active material layer according to claim 10, wherein an average particle diameter ($D_{50}$) of the hollow cathode active material is in a range of 0.1 μm to 20 μm.

18. The method of manufacturing a cathode active material layer according to claim 10, wherein pressing the mixture layer includes flat pressing at a pressure in a range of 800 MPa to 3000 MPa.

19. The method of manufacturing a cathode active material layer according to claim 10, wherein pressing the mixture layer includes roll pressing at a pressure in a range of 1.5 ton/cm to 10 ton/cm.

20. The method of manufacturing a cathode active material layer according to claim 16, wherein the mixture layer is heated at a temperature in a range of 140° C. to 220° C.

* * * * *